UNITED STATES PATENT OFFICE.

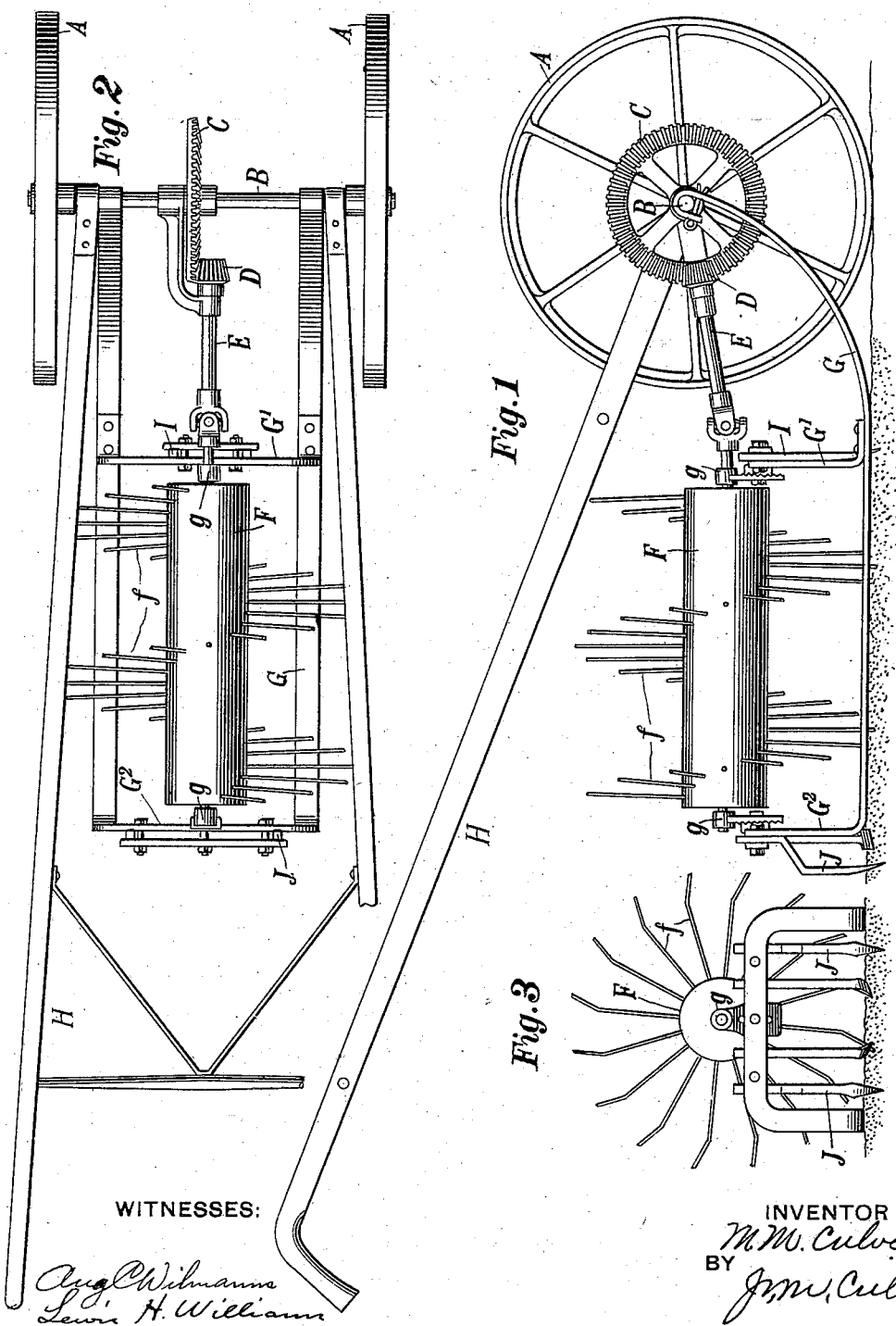

MOSES M. CULVER, OF GLIDDEN, IOWA.

CULTIVATOR.

SPECIFICATION forming part of Letters Patent No. 650,170, dated May 22, 1900.

Application filed May 15, 1899. Serial No. 716,827. (No model.)

*To all whom it may concern:*

Be it known that I, MOSES M. CULVER, a citizen of the United States, residing at Glidden, in the county of Carroll and State of Iowa, have invented a new and useful Improvement in Cultivators, of which the following is a specification.

My invention has for its object to provide a device to be used in cultivating plants in rows while the plants are still very young and tender by thoroughly disturbing the entire surface of the ground in the row between the plants.

It is known to all who have had experience in raising such crops as onions, sugar-beets, broom-corn, and such plants as grow very slowly at first that the soil must be kept entirely free from weeds and, further, that while these plants have a good hold in the ground by their roots the roots of the small weeds are much shorter and spread just below the surface. I have found that if the surface of the ground is slightly, though thoroughly, disturbed, even though to but little depth, the weeds may be uprooted without any injury to the plants.

To this end my invention consists, essentially, of a revolving drum carried parallel with and above the row, said drum being studded with teeth which as the drum revolves cut the surface of the ground crosswise of the row at very short intervals.

In the drawings, Figure 1 is a side view of the cultivator embodying my invention. Fig. 2 is a top view, and Fig. 3 is a view from the rear, of the sliding frame that supports the revolving drum.

The weight is partly carried and rotary motion given to the parts by wheels A, pinned to the axle B, to which is also keyed the bevel driving-gear C. A bevel-pinion D, driven by this gear, is mounted on a longitudinal shaft E, which is connected by a knuckle-joint to the shaft of the drum F. This drum is supported on standards $G'$ and $G^2$ from a sliding frame G, which is hinged on the main axle. The drum F is provided with a row of teeth $f$, preferably set spirally. Adjustment of the drum vertically is provided in the notched brackets $g$. The speed of the parts is such that the teeth $f$ strike across the row about one-fourth of an inch apart, thus thoroughly disturbing the surface of the ground immediately about the plant and some inches on each side of the row. Shovels are provided adjustable up and down and toward and from the row. One set I I in advance of the toothed drum breaks up the surface close to and at each side of the row, so that the teeth may take hold more readily. Other shovels J J follow the drum and are set deeper to cultivate the soil between the rows.

In the drawings handles H are shown, whereby the operator may push the machine; but it can be propelled in any desired manner.

What I claim is—

In a cultivator the combination with traction-wheels pinned to a transverse shaft having a bevel-gear keyed thereto, of a longitudinal shaft at right angles to the transverse shaft carrying a bevel-pinion which meshes with a gear on the transverse shaft, and drum mounted on a longitudinal shaft carrying rows of radial teeth set spirally, cultivating-shovels and supporting-runners at each side of the row, all substantially as specified and for the purpose set forth.

MOSES M. CULVER.

Witnesses:
   KITT W. MAREAN,
   N. E. KOFER.